(12) United States Patent
Melenkevitz

(10) Patent No.: US 11,779,013 B2
(45) Date of Patent: *Oct. 10, 2023

(54) STABILIZED PEROXYACID SOLUTIONS

(71) Applicant: Evonik Corporation, Piscataway, NJ (US)

(72) Inventor: Gregory Melenkevitz, Union, NJ (US)

(73) Assignee: Evonik Corporation, Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/734,329

(22) PCT Filed: Aug. 1, 2019

(86) PCT No.: PCT/US2019/044656
§ 371 (c)(1),
(2) Date: Dec. 2, 2020

(87) PCT Pub. No.: WO2020/028657
PCT Pub. Date: Feb. 6, 2020

(65) Prior Publication Data
US 2021/0219543 A1    Jul. 22, 2021

Related U.S. Application Data

(60) Provisional application No. 62/713,801, filed on Aug. 2, 2018.

(51) Int. Cl.
*A01N 25/02* (2006.01)
*A01N 25/22* (2006.01)
*A01N 37/16* (2006.01)

(52) U.S. Cl.
CPC ............ *A01N 25/02* (2013.01); *A01N 25/22* (2013.01); *A01N 37/16* (2013.01)

(58) Field of Classification Search
CPC ................. A01N 25/22; A01N 37/16
See application file for complete search history.

(56) References Cited

U.S. PATENT DOCUMENTS

| | | | |
|---|---|---|---|
| 2,347,434 A | 4/1944 | Reichert et al. | |
| 2,590,856 A | 4/1952 | Greenspan et al. | |
| 2,609,391 A | 9/1952 | Greenspan et al. | |
| 6,254,801 B1 | 7/2001 | Reinold et al. | |
| 6,576,213 B1* | 6/2003 | Falgen | C01B 11/026 423/478 |
| 2005/0152991 A1* | 7/2005 | Man | A61K 45/06 514/557 |
| 2013/0259743 A1* | 10/2013 | Keasler | C02F 3/342 424/94.4 |
| 2014/0097144 A1* | 4/2014 | Li | C02F 1/40 210/759 |
| 2014/0238445 A1 | 8/2014 | Stokes et al. | |

FOREIGN PATENT DOCUMENTS

| | | |
|---|---|---|
| CN | 107 739 327 A | 10/2018 |
| EP | 0 563 584 A2 | 10/1993 |
| GB | 925373 | 5/1963 |
| JP | 2015103263 A * | 6/2015 |
| KR | 10-2014-0086986 | 7/2014 |
| WO | 91/07375 A1 | 5/1991 |
| WO | 91/13058 A1 | 9/1991 |
| WO | 2013/059970 A1 | 5/2013 |

OTHER PUBLICATIONS

International Search Report dated Jan. 3, 2020 in PCT/US2019/044656 (5 pages).
Written Opinion dated Jan. 3, 2020 in PCT/US2019/044656 (6 pages).
Brazilian Search Report dated May 8, 2023, in Brazilian Application No. 112021001876-0, 4 pages.
Indonesian Office Action dated May 8, 2023, in Indonesian Application No. P00202101448, 5 pages.
Korean Office Action dated Jun. 11, 2023, in Korean Application No. 10-2021-7003020, with En Iish translation, 11 pages.

* cited by examiner

*Primary Examiner* — Snigdha Maewall
(74) *Attorney, Agent, or Firm* — Grüneberg and Myers PLLC.

(57) ABSTRACT

Aqueous solutions of peroxyacids are stabilized by a polymeric stabilizer selected from a phosphino polycarboxylic acid, a poly(acrylic acid)-acrylamidoalkylpropane sulfonic acid co-polymer, or a poly(acrylic acid)-acrylamidoalkylpropane sulfonic acid-sulfonated styrene terpolymer. The polymer-stabilized peroxyacid solutions have applications in aseptic sterilization and disinfecting of surfaces.

16 Claims, No Drawings

STABILIZED PEROXYACID SOLUTIONS

CROSS-REFERENCE TO RELATED APPLICATION

This application is a 35 U.S.C. § 371 U.S. national phase entry of International Application No. PCT/US2019/044656 having an international filing date of Aug. 1, 2019, which claims the benefit of U.S. Provisional Application No. 62/713,801 filed Aug. 2, 2018, both of which are incorporated herein by reference in its entirety.

FIELD

This invention concerns stabilized aqueous peroxyacid solutions, and processes for the preparation and use of such solutions for aseptic sterilization or disinfecting a surface. The invention particularly concerns stabilized solutions of aliphatic peroxyacids, especially peracetic acid solutions.

BACKGROUND

Aqueous solutions of peroxyacids have numerous applications in industry, including particularly use as bleaching agents, reagents in chemical synthesis, and especially as disinfectants for domestic, industrial and environmental applications. Many of these applications are carried out at locations removed from the location at which the peroxyacid is produced, and thus the peroxy acids are advantageously stable at the very least during transport to the application site. In a very large number of cases, the peroxyacid can also be stored, for example in warehouses, for a significant period, often in the region of months or even years, prior to use.

The stability of peroxyacid solutions can be improved by the avoidance of the introduction into the solution during its manufacture of impurities which can destabilize the peracid, notably transition metal ions. However, as a practical matter it is virtually impossible to ensure that no such impurities are present. Furthermore, even if impurities are avoided during manufacture, there remains the possibility that impurities may be introduced during any subsequent packaging or transportation of the solution. It is therefore desirable that the peracid solutions are stabilized against decomposition by such impurities. In addition to stabilizing the peracid solution during storage, the presence of stabilizers in the peracid solution may also have the additional benefit of enhancing the stability of the peracid solution in use, and consequently increasing the efficacy of the solution. The presence of stabilizers can also reduce the hazardous properties of the solution.

Many systems have been proposed for use as stabilizers for peracid solutions. Amongst those which have found wide application include dipicolinic acid, for example as disclosed in U.S. Pat. No. 2,609,391. Other compounds include phosphonates, notably those disclosed in British Patent No. 925,373 Henkel. In some instances, combinations of stabilizers are employed, for example the combinations of dipicolinic acid and phosphonates disclosed in International application publication numbers. WO91/07375 and WO91/13058. Phosphates have been proposed for use as stabilizers for peracid solutions in U.S. Pat. Nos. 2,347,434 and 2,590,856. European Patent No. 0 563 584 teaches that stannates can be employed to stabilize peracid solutions provided the stannate is added to the peracid solution during or after manufacture, or is added to the reaction mixture immediately before the reaction commences. The stannate can be employed in the peracid solution in conjunction with a separately added co-stabilizer, and although a large number of potential co-stabilizers, including poly and pyrophosphoric acids and their salts are contemplated, only dipicolinic acid and 1-hydroxyethane-1,1-diphosphonic acid are exemplified.

Although some stabilizer systems for peracid solutions are already known, it remains desirable to identify additional or further systems.

SUMMARY

According to one aspect of the invention there is provided an aqueous solution of a peroxyacid comprising a peroxyacid; and one or more polymeric stabilizers selected from a) a phosphino polycarboxylic acid, or salt thereof, the phosphino polycarboxylic acid having a molecular weight of 1500 to 10,000 g/mol; and b) a polymer, or salt thereof, with molecular weight of 3000 to 15,000 g/mol, the polymer being derived from a plurality of monomer units of each of

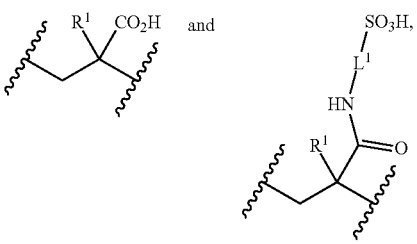

and optionally

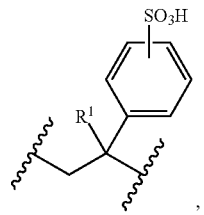

wherein $R^1$ is hydrogen or $C_{1-4}$alkyl and $L^1$ is $C_{2-6}$alkylene.

The invention provides stabilized peroxyacid solutions with improved stability from trace metal attack and decomposition. The stabilized peroxyacid solutions are suitable for food applications as well as to provide scale control properties to allow their use in oil field applications where metals and scale control are needed. The stabilized peroxyacid solutions may be used with higher levels of typical stabilizers (phosphate, stannate, dipiccolnic acid, chelant, etc.) or removal of chelant where chelants are not accepted.

In another aspect is provided a process for the stabilization of an aqueous solution of a peroxyacid by means of the addition of an effective amount of one or more polymeric stabilizers, as described herein.

According to another aspect of the present invention, there is provided a process for disinfecting packaging material comprising contacting the packaging material with the aqueous peroxyacid solution according to the invention.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

For the recitation of numeric ranges herein, each intervening number there between with the same degree of precision is explicitly contemplated. For example, for the range 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9 and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein the term "peroxyacid" is interchangeable with "peracid."

For any component, % and ppm herein is by weight based on the total weight of the composition, unless specifically stated otherwise.

Peroxyacids which can be stabilized in solution include those derived from mineral acids such as Caro's acid. Preferably, however, are percarboxylic acids where the pKa of the percarboxylic group in aqueous solution is between 6 and 9. Examples of such peracids include low molecular weight aliphatic peroxyacids, containing up to 6 carbon atoms, of which especially preferred examples comprise peracetic acid and perpropionic acid. Other examples include performic acid, perbutyric acid, dipersuccinic acid, diperglutaric acid, and diperadipic acid. The alkyl part of the chain may be optionally substituted with one-or more substituents selected from halo-, nitro-, amido-, hydroxy-, carboxy-, sulpho-, or phosphono-groups. Contemplated from this group are monochloroperacetic acid, dichloroperacetic acid, trichloroperacetic acid, and trifluoroperacetic acid. Further examples include the monoperacids of dibasic carboxylic acids such as monopersuccinic acid, monoperglutaric acid, monoperadipic acid, and also percitric acid and pertartaric acid. Additionally the substituent may be further derivatized to give groups such as esters or ethers. Examples of these are monoester peracids of formula:

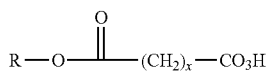

where R represents an alkyl group having from 1 to 4 carbons and x is from 1 to 4.

A mixture of peracids, particularly a mixture of mono and di-, persuccinic, perglutaric and peradipic acids, may be employed if desired. Especially suitable are the monoester per acids given above, and more especially, mixtures of these comprising x=2, 3, and 4. The compositions may alternatively or additionally include aromatic and substituted aromatic peroxyacids, such as monoperphthalic acid or salts thereof, sulphoperbenzoic acid or salts thereof chloroperbenzoic acids, and tolueneperbenzoic acids.

Additionally, one or more higher molecular weight aliphatic peroxyacids having 6-18 carbon atoms may be employed in combination with the low molecular weight aliphatic peracids given above, although it is recognized that these higher molecular weight aliphatic peroxyacids might not be totally soluble in the stabilized solution. Particularly suitable higher molecular weight acids are linear aliphatic monoperoxy-fatty acids, or monperoxy- or diperoxydicarboxylic acids. Examples of this are peroxyoctanoic acid, peroxydecanoic acid, monoperoxy- or diperoxyazelaic acid, monoperoxy- or diperoxysebacic acid, and monoperoxy- or diperoxydodecanedioic acid.

The peracid, which in fact may be a mixture of peracids, can be present in a wide range of concentrations, for example up to 40%, often up to 15% and more often up to 10%. The lower limit for the concentration of the peracid is at the discretion of the user but is normally not below 0.001%. The invention is particularly applicable to ready to use compositions containing a low concentration of peracid, including for example compositions intended for application for cleansing and/or disinfecting purposes to hard surfaces and particularly to non-horizontal surfaces. Such dilute compositions typically contain not less than 0.05%, often not less than 0.1% and more often, not less than 0.5%. For example, in a number of practical embodiments the peracid content is from 0.2%, and often from 0.5%, to 1.5%. In some embodiments, the peroxyacid content is less than about 35%. In some embodiments, the peroxyacid content is about 1-25 wt. %, i.e., about 1, 2, 3, 4, 5, 6, 8, 9, 10, 11, 12, 13, 14, 15, 16, 17, 18, 19, 20, 21, 22, 23, 24, or 25 wt. %. In some embodiments, peroxyacid is present in about 20-25 wt. %, 21-23 wt. %, 12-18 wt. %, 14-16 wt. %, 2-14 wt. %, 3-12 wt. %, 4-11 wt. %, 5-9 wt. %, about 6-8 wt. %. In some embodiments, the peroxyacid is present in about 22 weight %. In some embodiments, the peroxyacid is present in about 15 weight %. In other embodiments, the peroxyacid is present in about 5 weight %. It will be recognized that such compositions may contain a significant concentration of hydrogen peroxide, which may, for example, comprise from 1 to 15% of the composition and in a number of embodiments from 3 to 10%.

In various embodiments, hydrogen peroxide is present in about 10 wt. % to about 50 wt. % of the composition. In some embodiments (e.g., after equilibration and formation of peracetic acid), the hydrogen peroxide is present in about 10-40 wt. %, 15-35 wt. %, 18-30 wt. % or about 20-26 wt. % of the composition. In some embodiments, the hydrogen peroxide is present in about 16 wt. %, 18 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 34 wt. %, or about 36 wt. %. In some embodiments, the hydrogen peroxide is about 35 wt. % in water, present in about 18 wt. % to about 32 wt. % of the composition. In some embodiments, hydrogen peroxide is about 35 wt. % in water, present in about 28 wt. % of the composition. In some embodiments, hydrogen peroxide is about 35 wt. % in water, present in about 20 wt. % to about 26 wt. % of the composition.

Peracid compositions suitable for stabilization according to the present invention, and particularly those containing aliphatic peracids, are often conveniently derived by oxidation of the corresponding aliphatic carboxylic acid with aqueous hydrogen peroxide, optionally in the presence of a strong acid catalyst, and often contain residual amounts of both the carboxylic acid and hydrogen peroxide.

In one aspect of the invention, the solutions to be stabilized comprise the so-called equilibrium peroxycarboxylic acids such as peracetic acid with a content of 0.05 to 40% peracetic acid, preferably 4 to 20% peracetic acid: 5 to 40% acetic acid; 1 to 30% hydrogen peroxide, and the rest being water. Optionally, the solutions contain sufficient mineral acid, such as sulphuric acid, to accelerate the attainment of equilibrium.

Such compositions in many instances contain up to 40% of the corresponding carboxylic acid and up to 30% hydrogen peroxide, with a minimum water content usually of 20%. However, in dilute peracid solutions, the concentration of the carboxylic acid and of hydrogen peroxide each tend to be selected in the range from 0.1% to 12%. The total concentration of carboxylic acid plus percarboxylic acid is often from 0.1 to 50%. It is often convenient to restrict the concentration of hydrogen peroxide to no greater than 7%.

One way of defining such systems is in terms of the equilibrium constant, K. This can be conveniently represented as follows for the current system:

Hydrogen Peroxide + Acetic Acid = Peracetic Acid + Water $$\text{For which: } K = \frac{[\text{Peracetic Acid}][\text{Water}]}{[\text{HydrogenPeroxide}][\text{Acetic Acid}]}$$

Peracetic acid is here being used as representative of peracids in general, for each of which the corresponding equation is valid.

It will be recognized that if two initially identical non-equilibrium compositions have, at the end of a storage period in which equilibration occurs, different equilibrium constants, then the one with the higher equilibrium constant, will have the higher peracetic acid content.

In another aspect of the invention, the solutions to be stabilized are non-equilibrium solutions of percarboxylic acids such as peracetic acid. Examples are those derived from distillation of a peracetic acid solution, and will usually contain only low amounts of acetic acid or hydrogen peroxide. It is recognized that use of such compositions is desirable and often necessary where for example, acetic acid can cause unnecessary side reactions. The removal further downstream in a process is often required on environmental and economic grounds and also to slow down the growth of micro-organisms which can foul pipes. For the above reasons the use of such non-equilibrium solutions can be especially useful in applications such as pulp delignification, and also in disinfection, particularly in the horticultural industry as well as hard surface cleaners.

Because however, they are non-equilibrium solutions, then once formed, they will rapidly start to revert to the equilibrium composition. Stabilization of these nonequilibrium peracids will obviously mean that the rate of re-equilibration, and hence reduction in the concentration of peracetic acid, is reduced. Although the process cannot be stopped completely, certain factors such as low temperature are known to slow it down. Such compositions typically contain up to 55% of peracetic acid with a small amount of hydrogen peroxide and acetic acid, the rest being water. In a number of other embodiments, the peracetic acid solution is further diluted with water to give solutions containing 20-40% of peracetic acid.

In a yet further aspect the solutions to be stabilized are those non-equilibrium solutions where the peracid is present in an amount in excess of that which would be present were equilibrium to be achieved. These can include so-called in-use compositions where the equilibrium or nonequilibrium solutions described in the previous aspects of the invention are diluted with one or more of the non-per acid components, most often with water. Such compositions will often have a peracid concentration of up to 2%, although the concentration is usually from about 0.001% to about 1%, preferably from about 0.002% to about 0.75%. These can also include compositions which have been cooled for a period prior to use, for example during transport or storage on-site. As the equilibrium constant for peracetic acid solutions is inversely proportional to the temperature, the cooled compositions will have a higher peracetic acid content than the warmer ones, to an extent dependent upon the progress of the composition towards the new equilibrium.

In some embodiments, the one or more polymeric stabilizers is selected from a phosphino polycarboxylic acid, or salt thereof. In some embodiments, the phosphino polycarboxylic acid has formula (I)

(I)

wherein $R^2$ is

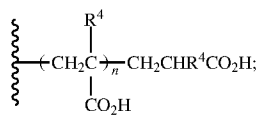

$R^3$ is

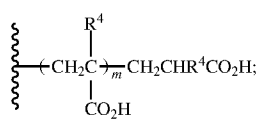

$R^4$, at each occurrence, is independently hydrogen or $C_{1-4}$ alkyl; and m and n are each independently an integer, where m+n is an integer from 30 to 60. In some embodiments, $R^4$ is hydrogen. In some embodiments, the phosphino polycarboxylic acid has a molecular weight of 3300-3900 g/mol.

In some embodiments, the one or more polymeric stabilizers is selected from a polymer, or salt thereof, with molecular weight of 3000 to 15,000 g/mol, the polymer being derived from a plurality of monomer units of each of

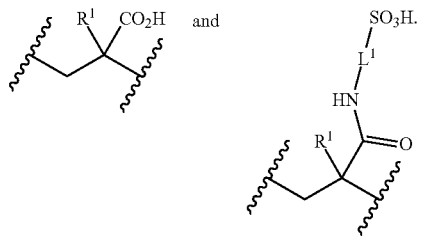

In some embodiments, the polymer is derived from a plurality of monomer units of each of

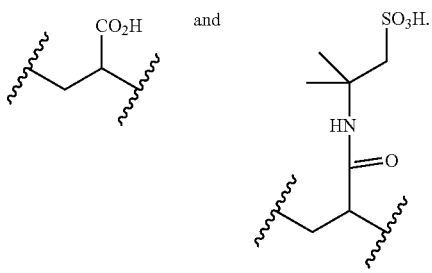

The polymeric stabilizers preferably consist of the specified monomer units. In some embodiments, the one or more polymeric stabilizers is selected from a polymer, or salt thereof, with molecular weight of 3000 to 15,000 g/mol, the polymer being derived from a plurality of monomer units of each of

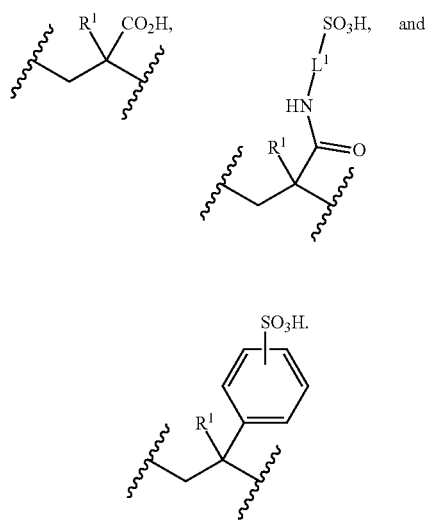

In some embodiments, the polymer is derived from a plurality of monomer units of each of

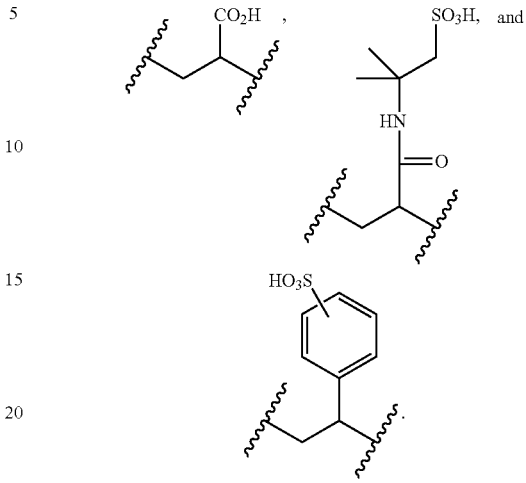

The polymeric stabilizers preferably consist of the specified monomer units.

In some embodiments, the peroxide solution is stabilized with 0.1-1500 ppm of the one or more polymeric stabilizers.

In some embodiments, the peroxyacid solution is stabilized with from 0.1-60 ppm, 0.1-50 ppm, 0.1-40 ppm, 0.1-30 ppm, 0.1-20 ppm, 0.1-10 ppm, 10-20 ppm, 20-30 ppm, 30-40 ppm, 40-50 ppm, or 50-60 ppm of the one or more polymeric stabilizers. In other embodiments, the peroxyacid solution is stabilized with higher concentrations of the one or more polymeric stabilizers. In some embodiments, the one or more polymeric stabilizers are added in an amount ≥100 ppm, ≥200 ppm, ≥300 ppm, ≥500 ppm, ≥750 ppm, ≥1000 ppm, ≥1500 ppm, or ≥2000 ppm.

The use of the polymeric stabilizer system herein does not preclude or restrict the presence of other known stabilizers for peroxygens. Stabilized peroxyacid solutions of the invention may include additional stabilizers or additives, such as a phosphate, a stannate, or a chelant. The polymeric stabilizers may be employed in conjunction with one or more compounds which can be present at concentrations of from 0.001% to 1%. Compounds such as polycarboxylic acids, including for example dipicolinic acid, ethylenediaminetetraacetic acid or citric acid, soluble salts of phosphates which may take the form of simple monomeric species, or of condensed linear polyphosphates or cyclic metaphosphates. Further known stabilizers which may be included are organophosphonates, which molecules may additionally contain other functional groups such as hydroxy or amino. These are exemplified in compounds such as 1-hydroxyethylidene-1,1-diphosphonic acid and poly(methyleneamino)-phosphonic acids such as aminotri(methylenephosphonic acid), and diethylenetriaminepenta(methylenephosphonic acid).

Useful stannates include an alkali metal stannate, particularly sodium stannate ($Na_2(Sn(OH)_6)$). Stannates further include stannic chloride, stannic oxide, stannic bromide, stannic chromate, stannic iodide, stannic sulfide, tin dichloride bis(2,4-pentanedionate), tin phthalocyanine dichloride, tin acetate, tin t-butoxide, di-n-butyl tin(IV) dichloride, tin methacrylate, tin fluoride, tin bromide, stannic phosphide, stannous chloride, stannous fluoride, stannous pyrophosphate, sodium stannate, stannous 2-ethylhexoate, stannous bromide, stannous chromate, stannous fluoride, stannous methanesulfonate, stannous oxalate, stannous oxide, stannous sulfate, stannous sulfide, barium stannate, calcium stannate, copper(II) stannate, lead stannate dihydrate, zinc stannate, sodium stannate, potassium stannate trihydrate, strontium stannate, cobalt(II) stannate dihydrate, sodium trifluorostannate, ammonium hexachlorostannate, and lithium hexafluorostannate.

Another optional component of the stabilized peroxy acid solutions is the soluble salt of a phosphate. The phosphate salt can take the form of the simple monomeric species, or of the condensed linear polyphosphate, or cyclic polyphosphate(metaphosphate). The monomeric phosphate salts are of the general formula, $M_nH_qPO_4$, (in which q=0, 1, or 2; n=1, 2, or 3; n+q=3). Here M can be one or more monovalent cations selected from the following: Li, Na, K, $NH_4$, $NR_4$ (where R represents an alkyl chain containing 1 to 5 C atoms). The polyphosphates have the general formula, $M_{n+2}P_nO_{3n+1}$ where n=2 to 8, and M can be chosen from Li, Na, K, $NH_4$, $NR_4$ where R represents an alkyl chain containing 1 to 5 C atoms). The cyclic polyphosphates have the general formula $MnPnO_3n$ where n=3 to 8 and M can be chosen from Li, Na, K, $NH_4$, $NR_4$ where R represents a linear or branched alkyl group containing 1 to 5 C atoms). The above may be optionally introduced into the stabilizer system in their acid form. Exemplary phosphates include pyrophosphoric acid and metaphorphoric acid and their salts, e.g., sodium salts.

Any phosphonic acid based chelant can optionally be used, such as amino trimethylene phosphonic acid (ATMP), 2-phosphonobutane-1,2,4-tricarboxylic acid (PBTCA), N-sulfonic amino dimethylene phosphonic acid (SADP), methylamine dimethylene phosphonic acid (MADMP), glycine dimethyl phosphonic acid (GDMP), 2-hydroxyphosphonocarboxylic acid (HPAA), polyhydric alcohol phosphate ester (PAPE), 1-hydroxyethylidene-1,1-diphosphonic acid (HEDP), 1-aminoethane-1,1-diphosphonic acid, amino tri(methylenephosphonic acid) (ATMP), ethylene diamine tetra(methylenephosphonic acid), hexamethylene diamine tetra(methylenephosphonic acid), diethylenetriamine penta(methylenephosphonic acid) (DTPMP), diethylenetriamine hexa(methylenephosphonic acid), and 1-aminoalkane-1,1-diphosphonic acids such as morpholinomethane diphosphonic acid, N,N-dimethyl aminodimethyl diphosphonic acid, aminomethyl diphosphonic acid, or salts thereof, preferably sodium salts.

Yet further stabilizers to be contemplated are free radical scavengers. Useful radical scavengers include pyridine carboxylic acids, such as 2,6-pyridine dicarboxylic acid and picolinic acid. Scavengers may be selected from amongst phenols, polyols, or thiols. Suitable scavengers are those selected from phenols which satisfy the general formula (II)

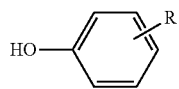

(II)

in which R represents at least one substituent selected from alkyl, ether, hydroxyl, carboxylic acid, and aliphatic carboxylic acid ester groups. Normally R in (II), represents from 1 to 4 substituents. One suitable sub-class of phenolic scavengers polyhydroxybenzoic acid or alkyl ester derivatives thereof, the benzene nucleus optionally being further substituted by one or more alkyl substituents. Normally not more than a single carboxylic acid/ester substituent is present. Included within that sub-class are the dihydroxybenzoic acids, gallic acid, pyrogallic acid and ester derivatives thereof. Other suitable sub-classes comprise polyhydroxy alkylbenzenes or ether derivatives thereof. Representatives of that subgroup include alkylresorcinols and alkylhydroquinones. Further suitable radical scavengers are substituted polyaryl compounds including those where one or more of the aryl rings is substituted with a heteroatom. A suitable example from this group is 8-hydroxyquinoline.

Also to be contemplated as phosphorus containing salts are organophosphonates which may be introduced as a soluble salt or as the parent acid. Compounds which may be contemplated include, ethylphosphonic acid, propylphosphonic acid, butylphosphonic acid, t-butylphosphonic acid, or phenylphosphonic acid. Additionally the phosphonic acid molecules can contain other functional groups such as hydroxy or amino. These are exemplified in compounds such; as 1-hydroxyethylidene-1,1-diphosphonic acid, and poly(methyleneamino) phosphonic acids such as aminotri (methylene phosphonic acid), and diethylenetriaminepenta (methylenephosphonic acid). Further additives which may be contemplated are sulphuric acid, or soluble salts thereof. Organosulphonic acids such as decylsulphonic acid, dodecylsulphonic acid, toluenesulphonic acid and methylsulphonic acid, as well as their salts, may also be introduced. Stannate may be employed at a concentration of up to 15% of the total stabilizer solution, more preferably at a concentration of between 8 to 12%.

The other phosphorus containing additives may be added at a total concentration of up to 18% with respect to the total weight of the stabilizer solution. More preferably a concentration between 10 to 14% is employed.

It is to be understood that the composition of the invention can include mixtures of one or more polymeric stabilizers, two or more of at least one protective colloid at least one radical scavenger and at least one phosphonic acid based chelant.

Accordingly, in some embodiments of the present invention there is provided a process for the stabilization of an aqueous solution of a peroxyacid by means of the addition of an effective amount of one or more polymeric stabilizer thereto.

The water to be used for the preparation of the stabilizer solution can be that obtained from the local municipal supply. More preferably the water is further purified such that its conductivity is reduced to below 1 μS/cm. For certain applications, ultra high purity water can be employed with a conductivity of below 0.06 μS/cm.

In specific embodiments, the composition of the present invention can be stable over extended periods of time (i.e., has a long-term stability). The term "long-term stability" refers to a substance undergoing little or no physical and/or chemical decomposition or degradation, over extended periods of time. In further specific embodiments, the composition of the present invention can be stable over extended periods of time, such that at about 1 atm and about 19° C., less than about 5 wt. % of each component independently degrades over about one year. In additional specific embodiments, the composition of the present invention can be stable over extended periods of time, such that at about 1 atm and about 19° C., at least about 95 wt. % of each component is independently present after about one year. Having the composition be relatively stable over extended periods of time will allow the composition to retain its effectiveness over that time, ensuring that it will remain useful and active for its intended purpose. In contrast, in those compositions that do not retain their effectiveness over that time, product loss can result, which can be financially costly.

The composition of the present invention can be used to effectively reduce the number of microbes located upon a substrate. In specific embodiments, the composition can effectively kill and/or inhibit a microorganism (e.g., virus, fungus, mold, slime mold, algae, yeast, mushroom and/or bacterium), thereby disinfecting the substrate.

In additional specific embodiments, the composition can effectively sanitize a substrate, thereby simultaneously cleaning and disinfecting the substrate. In additional specific embodiments, the composition can effectively kill or inhibit all forms of life, not just microorganisms, thereby acting as a biocide.

In specific embodiments, the composition can effectively disinfectant a substrate. In further specific embodiments, the composition can effectively disinfectant the surface of a substrate. In additional specific embodiments, the composition can effectively sterilize a substrate. In further specific embodiments, the composition can effectively sterilize the surface of a substrate.

The composition of the present invention can be formulated for application, depending upon the user's preference as well as the ultimate application of the composition. For example, the composition can be formulated for use in a sprayable composition, atomized liquid sprayer, or liquid applicator. Such formulations can include at least one of a spray bottle, motorized sprayer, wipe, cloth, sponge, non-woven fabric, and woven fabric. Such formulations may be particularly suitable for applying the composition to a surface of a hospital, physician's office, medical clinic, medical facility, dental office, dental facility, airport, school, pet store, zoo, children's day care, elderly nursing home, museum, movie theatre, athletic facility, sporting arena, gymnasium, rest room, bathroom, shopping center, amusement park, church, synagogue, mosque, temple, restaurant, food processing facility, food manufacturing facility, pharmaceutical company, hot-tub, sauna, and/or clean room. Such liquid formulations may be particularly suitable for applying the composition to metal, plastic, natural rubber, synthetic rubber, glass, stone, grout, fiberglass, wood, concrete, construction products, and/or building products.

Packaging materials (e.g., for food) may be disinfected with the stabilized peroxyacid solutions described herein. In some embodiments, the packaging material is made of PET. In some embodiments, the packaging material is contacted with the stabilized peroxyacid solution for sufficient time to disinfect the packaging material. In some embodiments, the process is a rinser cold disinfection, which rinses bottles (upside down) with an aqueous disinfectant solution, mostly based on a peroxy acid (e.g., peracetic acid) as active chemical. A second washing step with clear water must follow to remove remaining disinfectant. The rinser approach does not need high temperatures and is also named cold aseptic. Average consumption of peracetic acid is about 0.2-0.5 ml per unit.

In specific embodiments, the composition of the present invention can be non-toxic. The term "non-toxic" refers to a substance that has a relatively low degree to which it can damage a living or non-living organism. Toxicity can refer to the effect on a whole organism, such as an animal, bacterium, or plant, as well as the effect on a substructure of the organism, such as a cell (cytotoxicity) or an organ (organtoxicity), such as the liver (hepatotoxicity). A central concept of toxicology is that effects are dose-dependent; even water can lead to water intoxication when taken in large enough doses, whereas for even a very toxic substance such as snake venom there is a dose below which there is no detectable toxic effect. Having the composition be relatively non-toxic will allow a wider range of users be able to safely handle the composition, without serious safety concerns or risks.

The present invention also provides for a kit that includes: (a) an enclosed container that includes a removable closure; (b) the composition of the present invention as described herein, which is located inside the enclosed container; and (c) printed indicia located on the enclosed container.

In specific embodiments, the enclosed container can be opaque. In additional specific embodiments, the enclosed container can be manufactured from high density polyethylene (HDPE), thereby providing the requisite opacity. Having the enclosed container be manufactured from high density polyethylene (HDPE) will decrease the likelihood that the composition will degrade and/or decompose over extended periods of time, due to excessive exposure to direct sunlight.

It is understood that the foregoing detailed description and accompanying examples are merely illustrative and are not to be taken as limitations upon the scope of the invention, which is defined solely by the appended claims and their equivalents. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

EXAMPLE

An equilibrium peroxyacetic acid was prepared by mixing 58.5 parts by weight of a 50% by weight hydrogen peroxide, 28.4 parts by weight of acetic acid, 12.1 parts by weight of deionized water and 0.9 parts by weight of concentrated sulfuric acid (calculated initial active oxygen content: 13.77% by weight), dividing the mixture into five equal samples, adding stabilizer to the different samples in the amounts given in table 1 and letting the mixture stand at room temperature. HEDP is 1-hydroxyethylidene-1,1-diphosphonic acid. A4161 is Acumer™ 4161 from Rohm and Haas: a phosphinopolycarboxylic acid giving a pH of 3.0-3.5 and having a molecular weight of 3300-3900 g/mol measured by GPC of the acid form. Stability of the equilibrium peroxyacetic acid was assessed after 1 month by determining the volume of oxygen liberated by decomposition within 15 min from a 100 ml sample held at 60° C. after 45 min equilibration time, using a gas burette. Stability of the equilibrium peroxyacetic acid is insufficient for transport if the volume of oxygen liberated in this test exceeds 3 ml. Results are given in table 1.

Samples were analyzed after 13 weeks and after 20 weeks for peroxyacetic acid content and hydrogen peroxide content by redox titration of hydrogen peroxide with cerium(IV) sulfate, followed by iodide addition and back titration with thiosulfate for determining peroxyacid content. Table 2 gives the analysis results, the content of active oxygen calculated from the analyses and the fraction of active oxygen lost in the 7 week interval between analyses.

TABLE 1

| | Stabilizer added | | |
| Sample | HEDP (ppm) | A4161 (ppm) | Oxygen liberated (ml) |
| --- | --- | --- | --- |
| 1 | 800 | 0 | <0.1 |
| 2 | 0 | 200 | <0.1 |
| 3 | 0 | 600 | <0.1 |
| 4 | 0 | 1000 | <0.1 |
| 5 | 0 | 10000 | <0.1 |

TABLE 2

| | Content after 13 weeks (% by weight) | | | Content after 20 weeks (% by weight) | | | |
| Sample | PAA | Hydrogen peroxide | Active oxygen | PAA | Hydrogen peroxide | Active oxygen | Active oxygen loss in % |
| --- | --- | --- | --- | --- | --- | --- | --- |
| 1 | 15.17 | 22.42 | 13.74 | 14.83 | 21.99 | 13.46 | 2.0 |
| 2 | 14.75 | 22.16 | 13.53 | 15.01 | 21.97 | 13.49 | 0.3 |
| 3 | 14.79 | 22.27 | 13.59 | 15.02 | 22.08 | 13.54 | 0.3 |
| 4 | 14.87 | 22.09 | 13.52 | 15.08 | 22.25 | 13.64 | −0.9 |
| 5 | 14.87 | 21.96 | 13.46 | 15.14 | 21.79 | 13.43 | 0.2 |

For reasons of completeness, various aspects of the invention are set out in the following numbered clauses:

Clause 1. An aqueous composition comprising a peroxyacid; and one or more polymeric stabilizers selected from a) a phosphino polycarboxylic acid, or salt thereof, the phosphino polycarboxylic acid having a molecular weight of 1500 to 10,000 g/mol; and b) a polymer, or salt thereof, with molecular weight of 3000 to 15,000 g/mol, the polymer being derived from a plurality of monomer units of each of

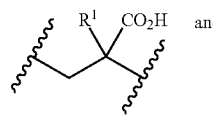 and 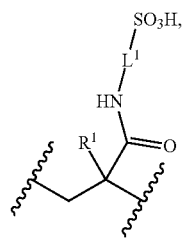

and optionally

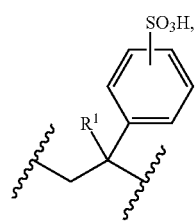

wherein $R^1$ is hydrogen or $C_{1-4}$alkyl and $L^1$ is $C_{2-6}$alkylene.

Clause 2. The composition of clause 1, wherein the one or more polymeric stabilizers is selected from the phosphino polycarboxylic acid, or salt thereof.

Clause 3. The composition of clause 2, wherein the phosphino polycarboxylic acid has formula (I):

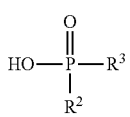 (I)

wherein
$R^2$ is

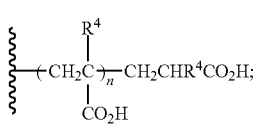

$R^3$ is

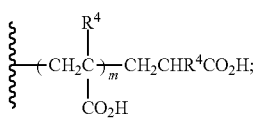

$R^4$, at each occurrence, is independently hydrogen or $C_{1-4}$alkyl; and m and n are each independently an integer, where m+n is an integer from 30 to 60.

Clause 4. The composition of clause 3, wherein $R^4$ is hydrogen.

Clause 5. The composition of clauses 3 or 4, wherein the phosphino polycarboxylic acid has a molecular weight of 3300-3900 g/mol.

Clause 6. The composition of clause 1, wherein the one or more polymeric stabilizers is selected from a polymer, or salt thereof, with molecular weight of 3000 to 15,000 g/mol, the polymer being derived from a plurality of monomer units of each of

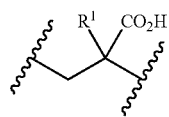 and 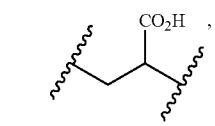

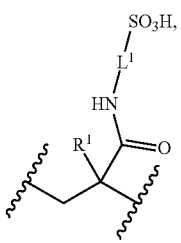

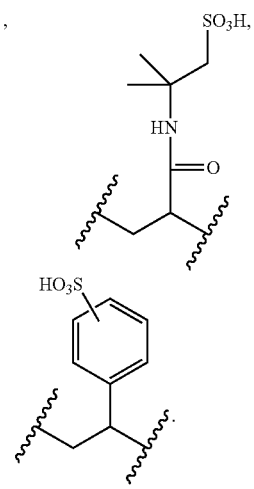

wherein R¹ is hydrogen or $C_{1-4}$alkyl and L¹ is $C_{2-6}$alkylene.

Clause 7. The composition of clause 6, wherein the polymer is derived from a plurality of monomer units of each of

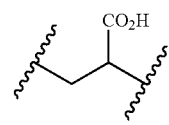 and 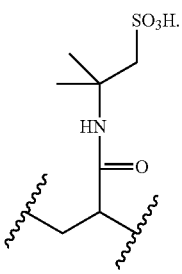

Clause 8. The composition of clause 1, wherein the one or more polymeric stabilizers is selected from a polymer, or salt thereof, with molecular weight of 3000 to 15,000 g/mol, the polymer being derived from a plurality of monomer units of each of

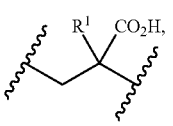 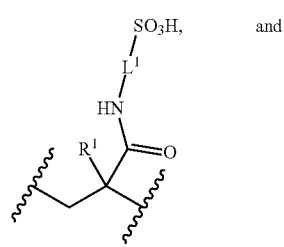 and

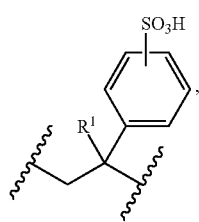

wherein R¹ is hydrogen or $C_{1-4}$alkyl and L¹ is $C_{2-6}$alkylene.

Clause 9. The composition of clause 8, wherein the polymer is derived from a plurality of monomer units of each of Clause 10. The composition of any one of clauses 1-9 comprising 0.1-1500 ppm of the one or more polymeric stabilizers.

Clause 11. The composition of any one of clauses 1-10 wherein the peroxy acid is one or more of peracetic acid and peroxyoctanoic acid.

Clause 12. The composition of any one of clauses 1-11 having a peroxyacid concentration of less than about 35 weight %.

Clause 13. The composition of any one of clauses 1-12 comprising from 4 to 20% by weight peracetic acid, from 5 to 40% by weight acetic acid, from 1 to 30% by weight hydrogen peroxide, and water in chemical equilibrium between peracetic acid, acetic acid, hydrogen peroxide and water.

Clause 14. The composition of any one of clauses 1-13 having ≤5 ppm of a chelating substance other than the one or more polymeric stabilizers.

Clause 15. A method of aseptic sterilization or disinfecting a surface comprising contacting the surface with the composition of any one of clauses 1-14.

Clause 16. The method of clause 15, wherein the surface is comprised by a packaging material.

Clause 17. The method of clauses 15 or 16 that is rinser cold disinfection.

Clause 18. The method of any one of clauses 15 to 17, wherein the surface is contacted with an aqueous solution prepared by diluting a composition of any one of clauses 1-14 with water to a peroxyacid content of from about 0.001 to about 1% by weight.

I claim:

1. An aqueous solution of a peroxyacid, comprising: an aliphatic peroxyacid comprising up to 6 carbon atoms or peroxyoctanoic acid: and from 0.1-1500 ppm of one or more polymeric stabilizers selected from the group consisting of a phosphino polycarboxylic acid, or salt thereof, the phosphino polycarboxylic acid having a molecular weight of 3,300-3,900 g/mol; wherein the aqueous solution has less than 0.1 m oxygen liberated.

2. The aqueous solution of a peroxyacid of claim 1, wherein the one or more polymeric stabilizers is selected from the phosphino polycarboxylic acid, or salt thereof, and wherein the aliphatic peroxyacid is selected from the group consisting of peracetic acid and perpropionic acid.

3. The aqueous solution of a peroxyacid of claim 2, wherein the phosphino polycarboxylic acid has formula (I):

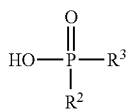
(I)

wherein
R² is

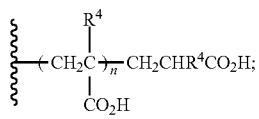

R³ is

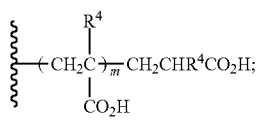

R⁴, at each occurrence, is independently hydrogen or $C_{1-4}$alkyl; and m and n are each independently an integer, where m+n is an integer from 30 to 60.

4. The aqueous solution of a peroxyacid of claim 3, wherein R⁴ is hydrogen.

5. The aqueous solution of a peroxyacid of claim 1, comprising from 0.1-60 ppm of the one or more polymeric stabilizers.

6. The aqueous solution of a peroxyacid of claim 1, wherein the aliphatic peroxyacid is peroxyoctanoic acid.

7. The aqueous solution of a peroxyacid of claim 1, having a peroxyacid concentration of less than about 35 weight %.

8. The aqueous solution of a peroxyacid of claim 1, comprising from 4 to 20% by weight peracetic acid, from 5 to 40% by weight acetic acid, from 1 to 30% by weight hydrogen peroxide, and water in chemical equilibrium between peracetic acid, acetic acid, hydrogen peroxide and water.

9. The aqueous solution of a peroxyacid of claim 1, having ≤5 ppm of a chelating substance other than the one or more polymeric stabilizers.

10. A method of aseptic sterilization or disinfecting a surface, comprising: contacting the surface with the composition of claim 1.

11. The method of claim 10, wherein the surface is comprised by a packaging material.

12. The method of claim 10, that is rinser cold disinfection.

13. The method of claim 10, wherein the surface is contacted with an aqueous solution prepared by diluting the composition with water to a peroxyacid content of from about 0.001 to about 1% by weight.

14. The aqueous solution of a peroxyacid of claim 1, which is a ready to use composition having a peroxyacid concentration of 0.05% to 1.5% by weight.

15. The aqueous solution of a peroxyacid of claim 1, having a peroxyacid concentration of 1 to 25% by weight.

16. The aqueous solution of a peroxyacid of claim 1, which has long term stability.

* * * * *